United States Patent
Kobayashi et al.

(10) Patent No.: US 8,370,105 B2
(45) Date of Patent: Feb. 5, 2013

(54) SYSTEM FOR DETECTING POSITION OF UNDERWATER VEHICLE

(75) Inventors: Ryosuke Kobayashi, Hitachi (JP); Satoshi Okada, Hitachi (JP); Yosuke Takatori, Hitachi (JP); Hiroshi Yamamoto, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 438 days.

(21) Appl. No.: 12/457,330

(22) Filed: Jun. 8, 2009

(65) Prior Publication Data
US 2009/0312980 A1  Dec. 17, 2009

(30) Foreign Application Priority Data
Jun. 13, 2008  (JP) .................................. 2008-155317

(51) Int. Cl.
*G01C 3/00* (2006.01)
*G06F 19/00* (2011.01)
*G06F 17/40* (2006.01)

(52) U.S. Cl. .................... 702/152; 73/865.8; 340/686.6; 356/3; 356/614; 382/106; 702/150; 702/187; 702/189; 708/200

(58) Field of Classification Search ................. 73/432.1, 73/865.8; 340/500, 540, 686.1, 870.01, 870.07, 340/988, 989, 993, 686.6; 356/3, 3.01, 3.1, 356/601, 602, 614, 622, 623; 382/100, 106; 701/1, 2, 200, 206, 207, 217, 220, 223, 400, 701/408, 467, 494, 500, 514, 522, 523, 527; 702/1, 33, 34, 35, 127, 150, 152, 153, 155, 702/158, 159, 166, 187, 189; 708/100, 105, 708/131, 160, 200
See application file for complete search history.

(56) References Cited

U.S. PATENT DOCUMENTS
| | | | |
|---|---|---|---|
| 5,337,149 A * | 8/1994 | Kozah et al. ................. | 356/601 |
| 2010/0226541 A1 * | 9/2010 | Kobayashi et al. ........... | 382/106 |

FOREIGN PATENT DOCUMENTS
| | | | |
|---|---|---|---|
| JP | 04-249798 | | 1/1991 |
| JP | 05-040029 | | 8/1991 |
| JP | 07-281753 | | 4/1994 |
| JP | 2005-315709 | | 4/2004 |
| JP | 2006-349449 | | 12/2006 |
| JP | 2006-349449 A | * | 12/2006 |
| JP | 2008-111780 A | * | 5/2008 |

* cited by examiner

*Primary Examiner* — Edward Cosimano
(74) *Attorney, Agent, or Firm* — Stites & Harbison, PLLC; Juan Carlos A. Marquez, Esq

(57) ABSTRACT

A position detection system for an underwater inspection unit or vehicle improves the detection accuracy of the unit's position. The unit includes a pressure sensor for detecting its vertical position, and an inertial sensor for detecting its attitude angle. The unit also includes a range sensor unit for detecting relative distances relative to a neighboring structure A in several directions on substantially the same plane. A control unit computes a position of a detection direction plane of the range sensor unit based on the unit's detected vertical position and attitude angle, and a cross-sectional shape and position of the structure at the computed position of the detection direction plane. Additionally, the control unit computes the unit's relative position with respect to the structure's cross-sectional shape based on detection results by the range sensor unit, and computes the unit's horizontal position based on position information of the structure's cross-sectional shape.

6 Claims, 11 Drawing Sheets

FIG.9

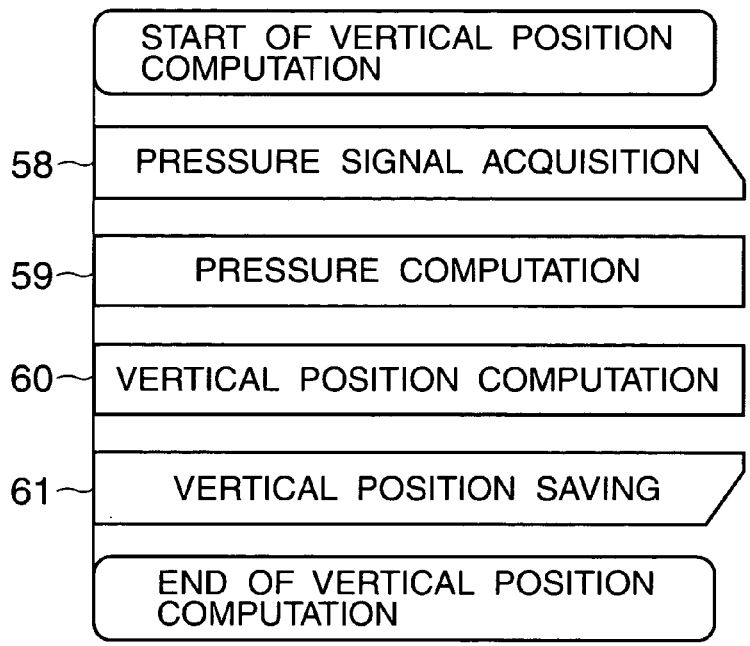

- 58 — PRESSURE SIGNAL ACQUISITION
- 59 — PRESSURE COMPUTATION
- 60 — VERTICAL POSITION COMPUTATION
- 61 — VERTICAL POSITION SAVING

START OF VERTICAL POSITION COMPUTATION

END OF VERTICAL POSITION COMPUTATION

FIG.10

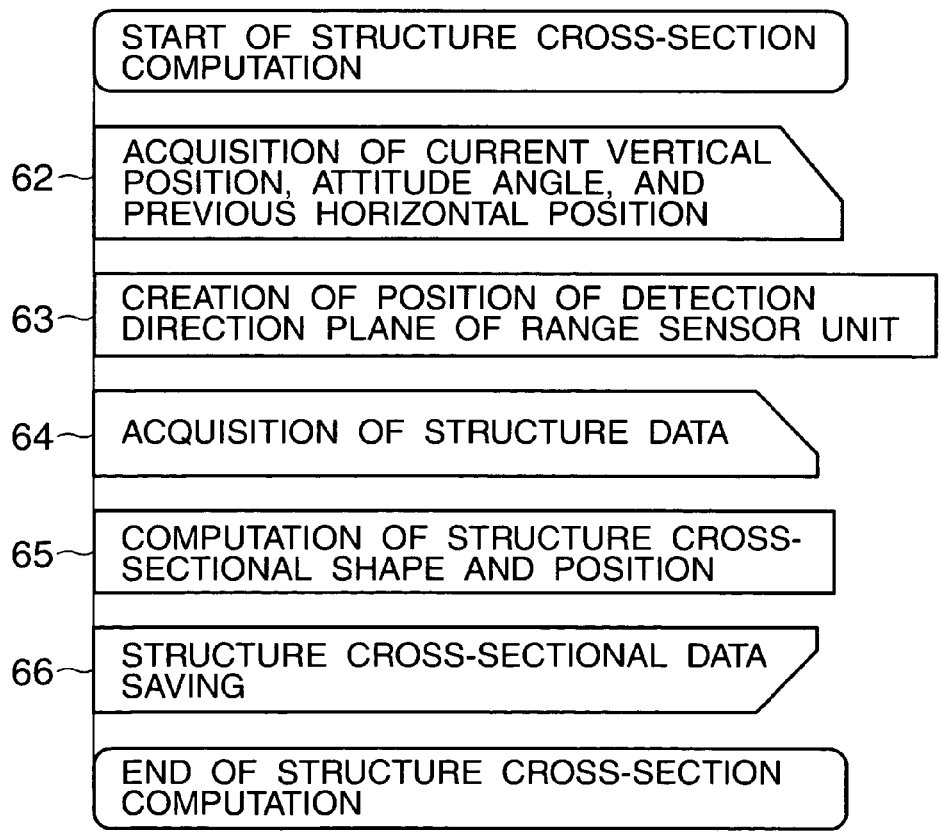

START OF STRUCTURE CROSS-SECTION COMPUTATION

- 62 — ACQUISITION OF CURRENT VERTICAL POSITION, ATTITUDE ANGLE, AND PREVIOUS HORIZONTAL POSITION
- 63 — CREATION OF POSITION OF DETECTION DIRECTION PLANE OF RANGE SENSOR UNIT
- 64 — ACQUISITION OF STRUCTURE DATA
- 65 — COMPUTATION OF STRUCTURE CROSS-SECTIONAL SHAPE AND POSITION
- 66 — STRUCTURE CROSS-SECTIONAL DATA SAVING

END OF STRUCTURE CROSS-SECTION COMPUTATION

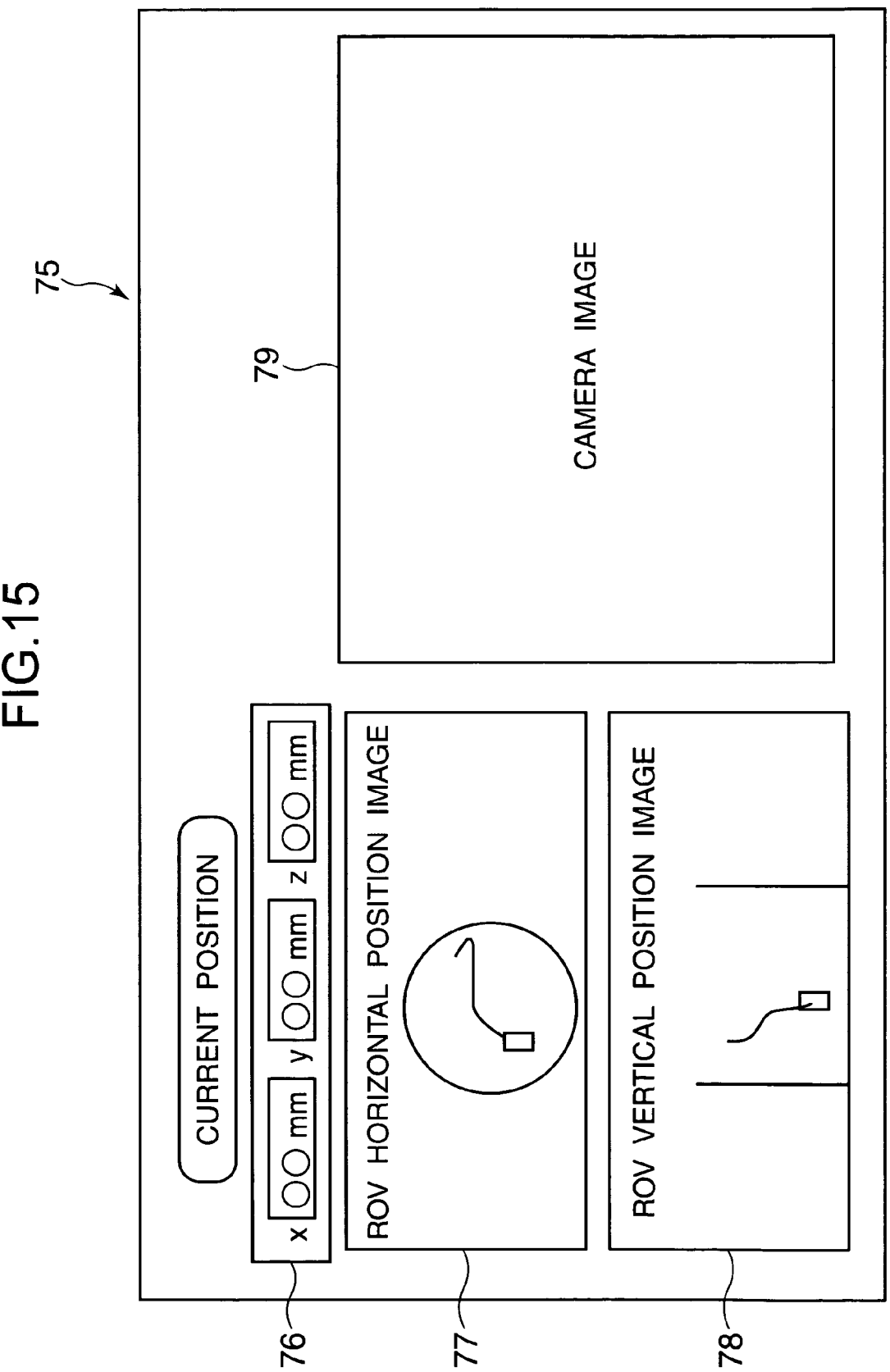

SYSTEM FOR DETECTING POSITION OF UNDERWATER VEHICLE

BACKGROUND OF THE INVENTION

1. Field of the Invention

The present invention relates to a system for detecting a position of an underwater vehicle capable of moving three-dimensionally.

2. Description of the Related Art

A nuclear in-reactor inspection system that uses, for example, a three-dimensionally movable underwater inspection unit (underwater vehicle) to inspect structures formed inside a nuclear reactor is traditionally known (refer to JP-A-2005-315709, for example). The nuclear in-reactor inspection system described in JP-A-2005-315709 includes an underwater inspection unit that has detection means to detect state quantities relating to a position and attitude of the inspection unit, and a thruster for assigning a thrust to the inspection unit. The nuclear in-reactor inspection system also includes a control unit connected to the underwater inspection unit via a cable in order to control the position and attitude of the underwater inspection unit. The detection means of the underwater inspection unit is constituted by an acceleration sensor for detecting tri-axial (X-axial, Y-axial, and Z-axial) acceleration levels, a gyroscope for detecting tri-axial angular velocities, and a camera by which an object to be inspected is imaged with an emitted slit laser beam projected on the object. The control unit uses detection results of the detection means to compute any variations in a position of the underwater inspection unit, totalize the variations in the position of the underwater inspection unit, and thus compute an absolute position thereof.

SUMMARY OF THE INVENTION

In the conventional technique of JP-A-2005-315709, the variations in the position of the underwater inspection unit are computed and the computed variations are totalized to compute the absolute position. This technique has therefore been likely to accumulate position variations computing errors and increase an error in the computation of the absolute position. Although error correction is by judging for contact between the underwater inspection unit and a structure, until the contact is discriminated and the correction is conducted, the error in the computation of the absolute position has been likely to increase. Detection accuracy on the position of the underwater inspection unit has therefore admitted of improvement.

An object of the present invention is to provide a system for detecting a position of an underwater vehicle, the system being adapted to improve detection accuracy on the position of the underwater vehicle.

(1) To achieve the above object, an aspect of the present invention is a system for detecting a position of an underwater vehicle adapted to move three-dimensionally, the system comprising:

a vertical position detector provided on the underwater vehicle for detecting a vertical position of the vehicle;

a relative distance detector provided on the underwater vehicle, the distance detector being adapted for detecting a relative distance between the underwater vehicle and a structure neighboring the vehicle, in each of at least three directions on substantially the same plane predefined with respect to the attitude of the vehicle;

storage means in which data on a three-dimensional shape and position of the structure is stored;

structure cross-section computing means for computing a position of a detection direction plane of the relative distance detector on the basis of the vertical position of the underwater vehicle that has been detected by the vertical position detector, and computing a cross-sectional shape and position of the structure at the computed position of the detection direction plane of the relative distance detector on the basis of the structure data that is stored in the storage means; and horizontal position computing means for computing, from detection results by the relative distance detector, a relative position of the underwater vehicle with respect to the structure cross-sectional shape that has been computed by the structure cross-section computing means, the horizontal position computing means being further adapted to compute a horizontal position of the underwater vehicle from position information in the cross-sectional shape of the structure.

(2) To achieve the above object, another aspect of the present invention is a system for detecting a position of an underwater vehicle adapted to move three-dimensionally, the system comprising:

a vertical position detector provided on the underwater vehicle for detecting a vertical position of the vehicle;

an attitude angle detector provided on the underwater vehicle for detecting an attitude angle of the vehicle;

a relative distance detector provided on the underwater vehicle, the distance detector being adapted for detecting a relative distance between the underwater vehicle and a structure neighboring the vehicle, in each of at least three directions on substantially the same plane predefined with respect to the attitude of the vehicle;

storage means in which data on a three-dimensional shape and position of the structure is stored;

structure cross-section computing means for computing a position of a detection direction plane of the relative distance detector on the basis of the vertical position and attitude angle of the underwater vehicle that have been detected by the vertical position detector and the attitude angle detector, respectively, and thus computing a cross-sectional shape and position of the structure at the computed position of the detection direction plane of the relative distance detector on the basis of the structure data that has been stored into the storage means; and horizontal position computing means for computing, from detection results by the relative distance detector, a relative position of the underwater vehicle with respect to the cross-sectional shape of the structure that has been computed by the structure cross-section computing means, the horizontal position computing means being further adapted to compute a horizontal position of the underwater vehicle from position information in the cross-sectional shape of the structure.

(3) The structure cross-section computing means in above item (2) is preferably is configured to initially compute the position of the detection direction plane of the relative distance detector on the basis of, in addition to the vertical position and attitude angle of the underwater vehicle that have been detected by the vertical position detector and the attitude angle detector, respectively, preassigned initial data relating to the horizontal position of the underwater vehicle, and after the structure cross-section computing means has computed the horizontal position of the underwater vehicle, compute the position of the detection direction plane of the relative distance detector on the basis of, in addition to the vertical position and attitude angle of the underwater vehicle detected by the vertical position detector and the attitude angle detector, respectively, previous computation results relating to the horizontal position of the underwater vehicle computed by the horizontal position computing means.

(4) The system outlined in any one of above items (1) to (3) is preferably configured to further include detection cross-section computing means by which, when the position of the underwater vehicle at the detection direction plane of the relative distance detector is defined as a reference position, a relative position of the surface of the structure with respect to the reference position is computed from the detection results of the relative distance detector; wherein the horizontal position computing means matches the relative position of the structure surface, computed by the detection cross-section computing means, and the cross-sectional shape of the structure, computed by the structure cross-section computing means, and thus computes a relative position of the underwater vehicle with respect to the cross-sectional shape of the structure that was computed by the structure cross-section computing means.

(5) The vertical position detector in any one of above items (1) to (4) is preferably a pressure sensor for detecting a depth of the underwater vehicle in water.

(6) The relative distance detector in any one of above items (1) to (5) is preferably a scanning laser sensor for scanning laser light in a number of directions and receiving the light reflected.

According to the present invention, detection accuracy on a position of an underwater vehicle can be improved.

BRIEF DESCRIPTION OF THE DRAWINGS

FIG. 9 is a PAD that represents details of a vertical position computation process shown in FIG. 7;

FIG. 10 is a PAD that represents details of a structure cross-section computation process shown in FIG. 7;

FIG. 15 is a diagram showing an example of a display screen of a display unit included in the embodiment.

DESCRIPTION OF THE PREFERRED EMBODIMENTS

Hereunder, a nuclear in-reactor inspection system that is a preferred embodiment of the present invention will be described referring to the accompanying drawings.

Figure 1:
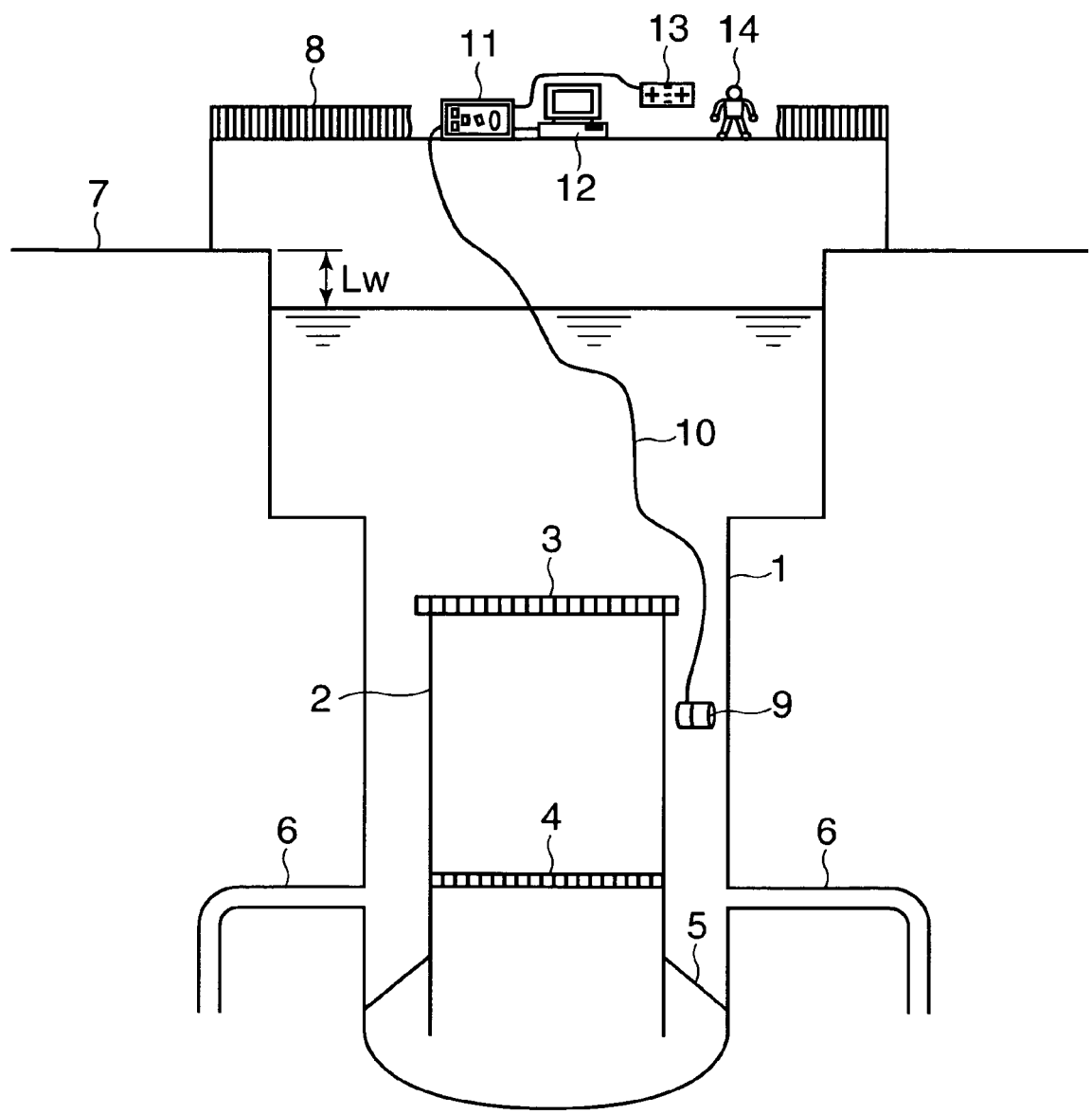
FIG. 1 is a schematic diagram representing an example of component layout of a nuclear in-reactor inspection system according to an embodiment of the present invention.

FIG. 1 is a schematic diagram representing an example of component layout of the nuclear in-reactor inspection system according to the present embodiment.

The nuclear reactor 1 in FIG. 1 includes structures such as a shroud 2, top guide 3, core support plate 4, and shroud support 5. The reactor 1 also includes a connected PLR (Primary Loop Re-circulation) pipeline 6. An operation floor 7 as a working space, is present on an upper section of the reactor 1, and a fuel-handling machine 8 exists above the reactor 1.

The nuclear in-reactor inspection system according to the present embodiment includes an underwater inspection unit 9 (underwater vehicle), a control unit 11, a display unit 12, and a controller 13. The underwater inspection unit 9 is used for visual testing of the structures within the reactor 1. The control unit 11 is connected to the underwater inspection unit 9 via a cable 10. The display unit 12 is connected to the control unit 11 to display a camera image of the underwater inspection unit 9 and to display a position, attitude, and other factors of the underwater inspection unit 9. The controller 13 is connected to the control unit 11 and capable of controlling the underwater inspection unit 9. In cases such as visually testing the structures within the reactor 1, an inspector 14 on the fuel-handling machine 8 puts the underwater inspection unit 9 into the reactor 1, and operates the controller 13 while confirming the position and attitude of the underwater inspection unit 9 on a screen of the display unit 12.

Figure 2:
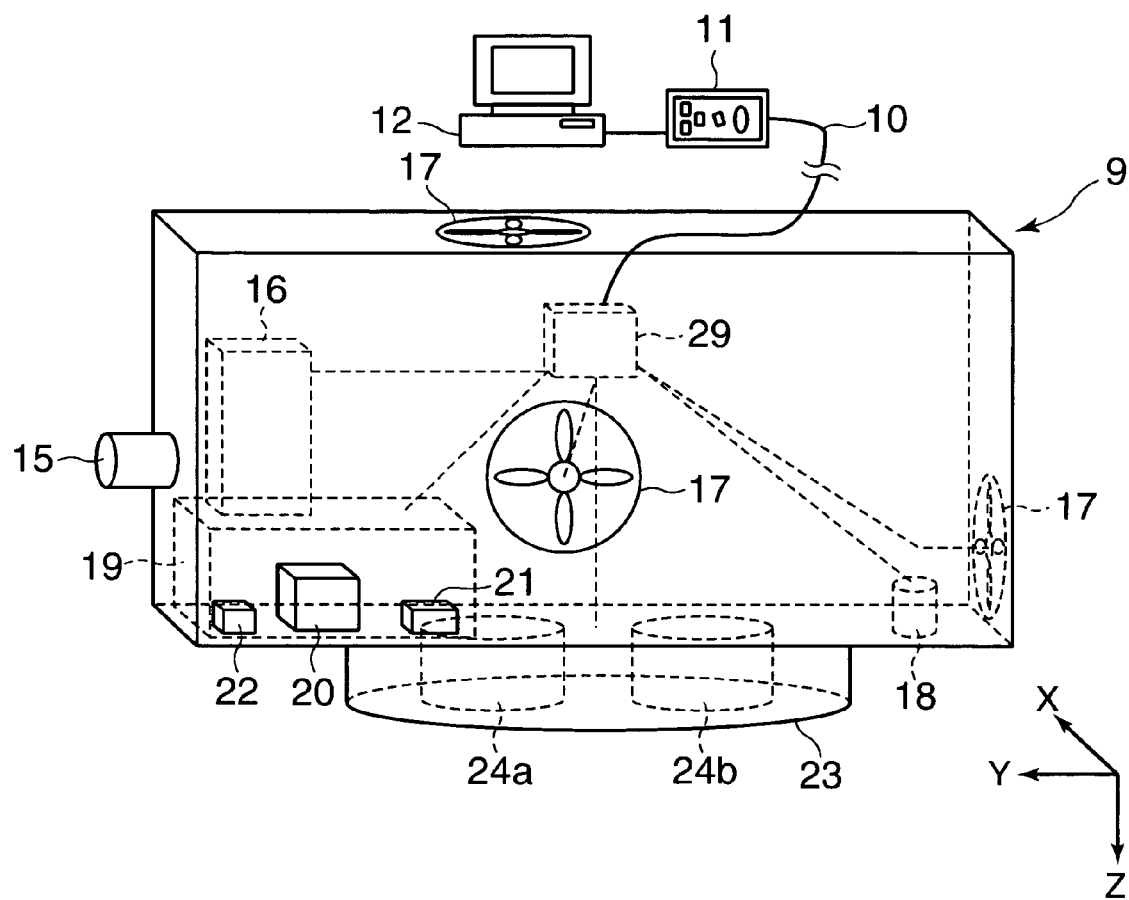
FIG. 2 is a schematic diagram representing a configuration of an underwater inspection unit in the above embodiment.

FIG. 2 is a schematic diagram representing a configuration of the underwater inspection unit 9.

Referring to FIG. 2, the underwater inspection unit 9 has a camera 15 and an image acquisition section 16. The camera 15 is provided on a front panel (left-side face in FIG. 2) of the inspection unit in order to image the internal structures of the reactor 1. The image acquisition section 16 acquires images from the camera 15 as electronic information. The underwater inspection unit 9 also includes three thrusters 17, one on a top panel (an upper face in FIG. 2), a rear panel (a right-side face in FIG. 2), and a left-side panel (a face pointing the front of the paper of FIG. 2) each. Each thruster 17 includes a screw and a motor (not shown) for driving the screw to rotate in forward or reverse directions, and imparts a thrust in a vertical direction (i.e., vertically in FIG. 2), in a longitudinal direction (i.e., horizontally in FIG. 2), or in a lateral direction (i.e., diagonally in a direction perpendicular to the paper of FIG. 2). Thus, the underwater inspection unit 9 can move in water three-dimensionally. Hereinafter, coordinate systems of the underwater inspection unit 9 are described assuming that: a rightward direction of the inspection unit (i.e., a direction opposite to the front of the paper of FIG. 2) is defined as a positive direction of an X-axis, a forward direction (i.e., a leftward direction in FIG. 2) as a positive direction of a Y-axis, and a downward direction (i.e., a lower direction in FIG. 2) as a positive direction of a Z-axis.

The underwater inspection unit 9 further has a pressure sensor (depth sensor) 18 for detecting a depth of the underwater inspection unit 9 in the water, and an inertial sensor 19 for detecting an attitude angle of the underwater inspection unit 9. The inertial sensor 19 includes a tri-axis gyroscope 20 for detecting X-axial, Y-axial, and Z-axial angular velocities, a tiltmeter 21 for detecting X-axial and Y-axial tilt angles, and a magnetic sensor 22 for detecting a Z-axial azimuth angle. Furthermore, the underwater inspection unit 9 has at a lower portion thereof a range sensor unit 23 to measure relative distances with respect to the structures neighboring the underwater inspection unit 9.

Figure 3:
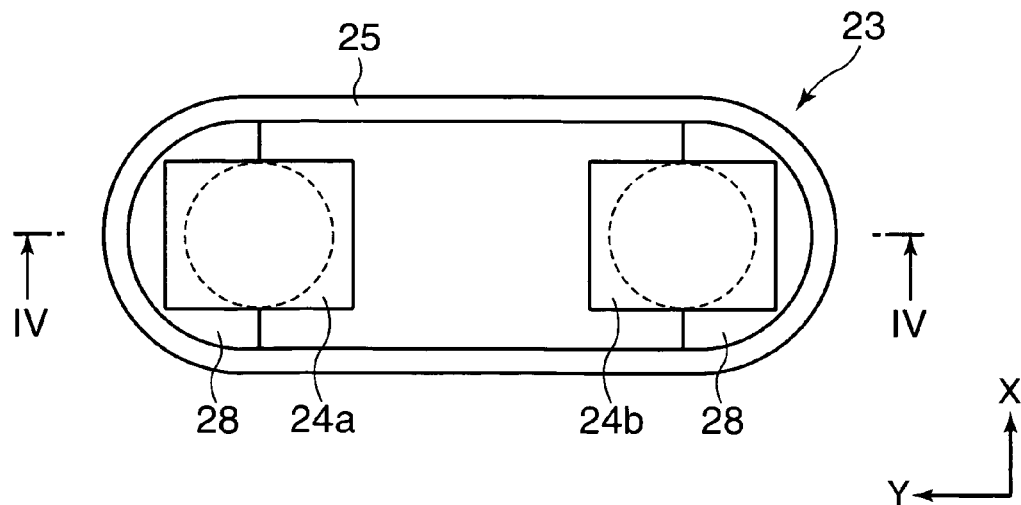
FIG. 3 is an X-axial cross-sectional view that represents a schematic construction of a range sensor unit of the underwater inspection unit in the embodiment.
Figure 4:
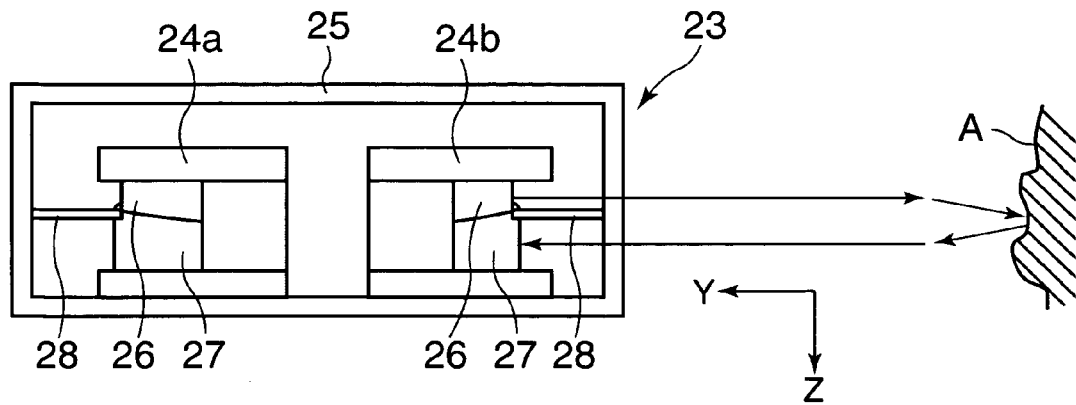
FIG. 4 is a Z-axial cross-sectional view of the range sensor unit as viewed through section IV-IV in FIG. 3.
Figure 5:
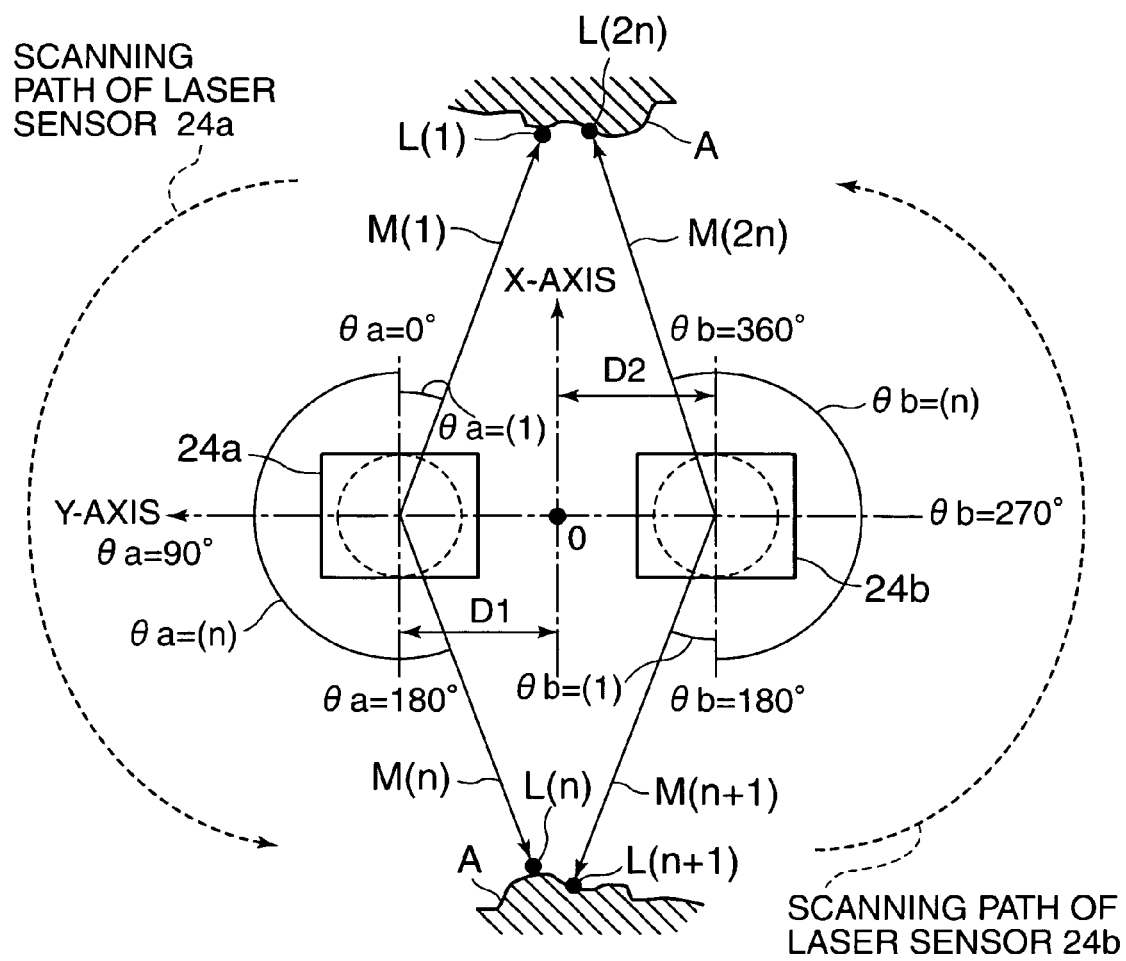
FIG. 5 is an explanatory diagram on measuring operation of the range sensor unit of the underwater inspection unit in the embodiment.

FIG. 3 is an X-axial cross-sectional view that represents a schematic construction of the range sensor unit 23. FIG. 4 is a Z-axial cross-sectional view of the range sensor unit 23 as viewed through section IV-IV in FIG. 3. FIG. 5 is an explanatory diagram on measuring operation of the range sensor unit 23.

The range sensor unit 23 in FIGS. 3 to 5 includes scanning-type laser sensors (laser range finders) 24a and 24b arranged on an anterior side of the sensor unit (i.e., on a left side of the figure) and a posterior side (right side of the figure), respectively. The range sensor unit 23 has a casing 25 in which to accommodate the laser sensors 24a, 24b. The laser sensors 24a, 24b are each constructed to scan laser light in a number of directions on substantially the same plane (in the present embodiment, a plane of the X-Y axis coordinates), receive the light reflected, and detect the relative distances with respect to neighboring structure A in each direction. More specifically, as shown in FIG. 5, the laser sensor 24a scans the laser light in a forward moving stroke range of the underwater inspection unit 9, that is, in a scan angle range $\theta a(1)$-$\theta a(n)$ (e.g., from about −30 degrees to about +210 degrees), and after receiving the light reflected, detects the relative distances M(1)-M(n) with respect to neighboring structure A, at corresponding angle positions. In addition, as shown in FIG. 5, the laser sensor 24b scans the laser light in a backward moving stroke range of the underwater inspection unit 9, that is, in a scan angle range $\theta b(1)$-$\theta b(n)$ (e.g., from about +150 degrees to +390 degrees), and after receiving the light reflected, detects the relative distances M(n+1)-M(2n) with respect to neighboring structure A, at corresponding angle positions.

The laser sensors 24a, 24b each include a beam projector 26 and a beam receiver 27, the projector and the receiver being separated from each other. Each laser sensor also has a substantially U-shaped beam-shielding plate 28 to provide partitioning between the projector 26 and the receiver 27. The beam-shielding plate 28 is constructed so that part of the laser light from the projector 26 is prevented from being reflected from an inner surface of the casing 25 and received by the receiver 27. Further detailed construction of the laser sensor 24a, 24b is substantially the same as disclosed in JP-A-2006-349449, for example. Description of the detailed construction is therefore omitted.

An anterior lateral face of the casing 25 is formed to have a circular cross section centrally in the laser sensor 24a. The laser light from the projector 26 of the laser sensor 24a exits the anterior lateral face in substantially perpendicular form, and the reflected light received at the receiver 27 of the laser sensor 24a enters the anterior lateral face in substantially perpendicular form. Similarly, a posterior lateral face of the casing 25 is formed to have a circular cross section centrally in the laser sensor 24b. The laser light from the laser sensor 24b exits the posterior lateral face in substantially perpendicular form, and the reflected light received at the laser sensor 24b enters the posterior lateral face in substantially perpendicular form. In other words, the casing 25 is constructed to suppress any decreases in intensity of the laser light.

Referring back to FIG. 2, the underwater inspection unit 9 further has a signal transmitter 29. Detection signals from the pressure sensor 18, inertial sensor 19 (more specifically, the tri-axis gyroscope 20, the tiltmeter 21, and the magnetic sensor 22), and range sensor unit 23 (more specifically, the laser sensors 24a, 24b), and image signals from the image acquisition section 16 are output to the control unit 11 via the signal transmitter 29 and the cable 10. The control unit 11 then computes the position and attitude of the underwater inspection unit 9 from the detection signals and the like, and outputs the computed position and attitude of the underwater inspection unit 9 to the display unit 12 for display of the position and attitude data. The control unit 11 outputs the image signals to the display unit 12 to display the images taken by the camera 15. The control unit 11 also generates control signals to drivingly control the thrusters 17 in response to operating signals from the controller 13, and outputs the generated control signals to each thruster 17 via the cable 10 and the signal transmitter 29.

Figure 6:
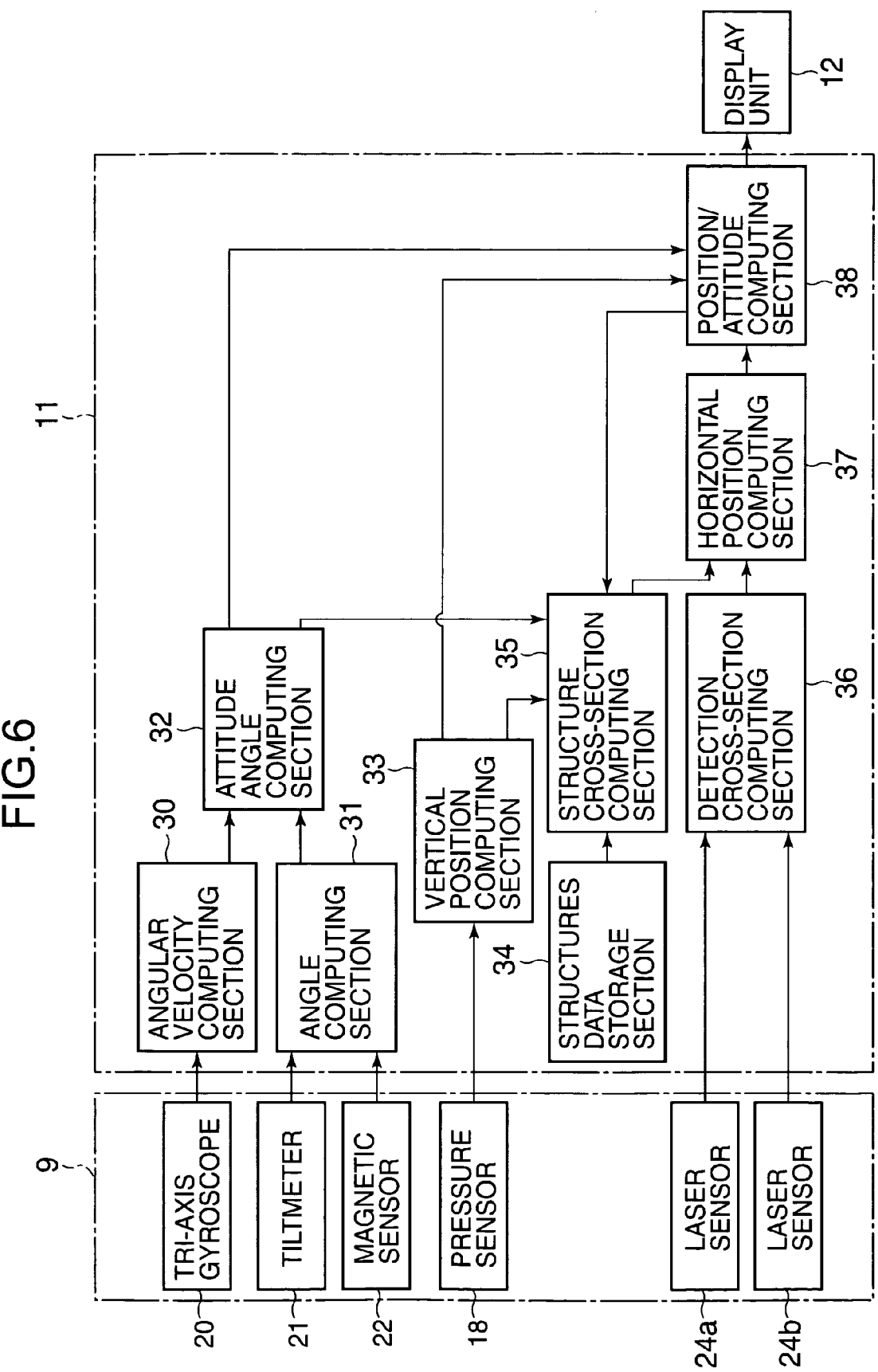
FIG. 6 is a functional block diagram that represents composition relating to position and attitude computing functionality of a control unit in the embodiment.

Next, the position and attitude computing functionality of the control unit 11 is described in detail below. FIG. 6 is a functional block diagram that represents composition relating to the position and attitude computing functionality of the control unit 11.

Referring to FIG. 6, the control unit 11 includes an angular velocity computing section 30, an angle computing section 31, and an attitude angle computing section 32. The angular velocity computing section 30 computes X-axial, Y-axial, and Z-axial angular velocities based on angular velocity signals acquired by the tri-axis gyroscope 20. The angle computing section 31 computes X-axial and Y-axial tilt angles based on angle signals acquired by the tiltmeter 21 and computes Z-axial azimuth angles based on angle signals acquired by the magnetic sensor 22. The attitude angle computing section 32 computes the attitude (tri-axial attitude angles) of the underwater inspection unit 9, based on the computed angle velocity, tilt angle, and azimuth angle data. The control unit 11 also has a vertical position computing section 33 that computes the depth, or vertical position, of the underwater inspection unit 9, based on pressure signals acquired by the pressure sensor 18.

The control unit 11 further has a structure data storage section 34, a structure cross-section computing section 35, a detection cross-section computing section 36, and a horizontal position computing section 37. The structure data storage section 34 stores structures data (design data) on three-dimensional shapes and positions of each internal structure of the reactor 1. The structure cross-section computing section 35 firstly computes an absolute position of a detection direction plane (plane of the X-Y coordinate system) of the range sensor unit 23 on the basis of the vertical position, attitude, and other data of the underwater inspection unit 9, computed by the vertical position computing section 33 and the attitude angle computing section 32, then computes from the structure data a cross-sectional shape and position of the structure at the computed position of the detection direction plane of the range sensor unit 23, and defines the computed cross-sectional shape and position data as the structure cross-sectional data. The detection cross-section computing section 36 is such that, when the position of the underwater vehicle at the detection direction plane of the range sensor unit 23 is defined as a reference position, a relative position of the surface of the structure with respect to the reference position is computed from the detection results by the range sensor unit 23 and adopted as detection cross-sectional data. The horizontal position computing section 37 computes a horizontal position of the underwater inspection unit 9, based on the structure cross-sectional data created by the structure cross-section computing section 35, and on the detection cross-sectional data created by the detection cross-section computing section 36. The control unit 11 additionally has a position and attitude storage section 38 for storing the vertical position, horizontal position, and attitude angle computed by the vertical position computing section 33, the horizontal position computing section 37, and the attitude angle computing section 32, respectively.

Figure 7:
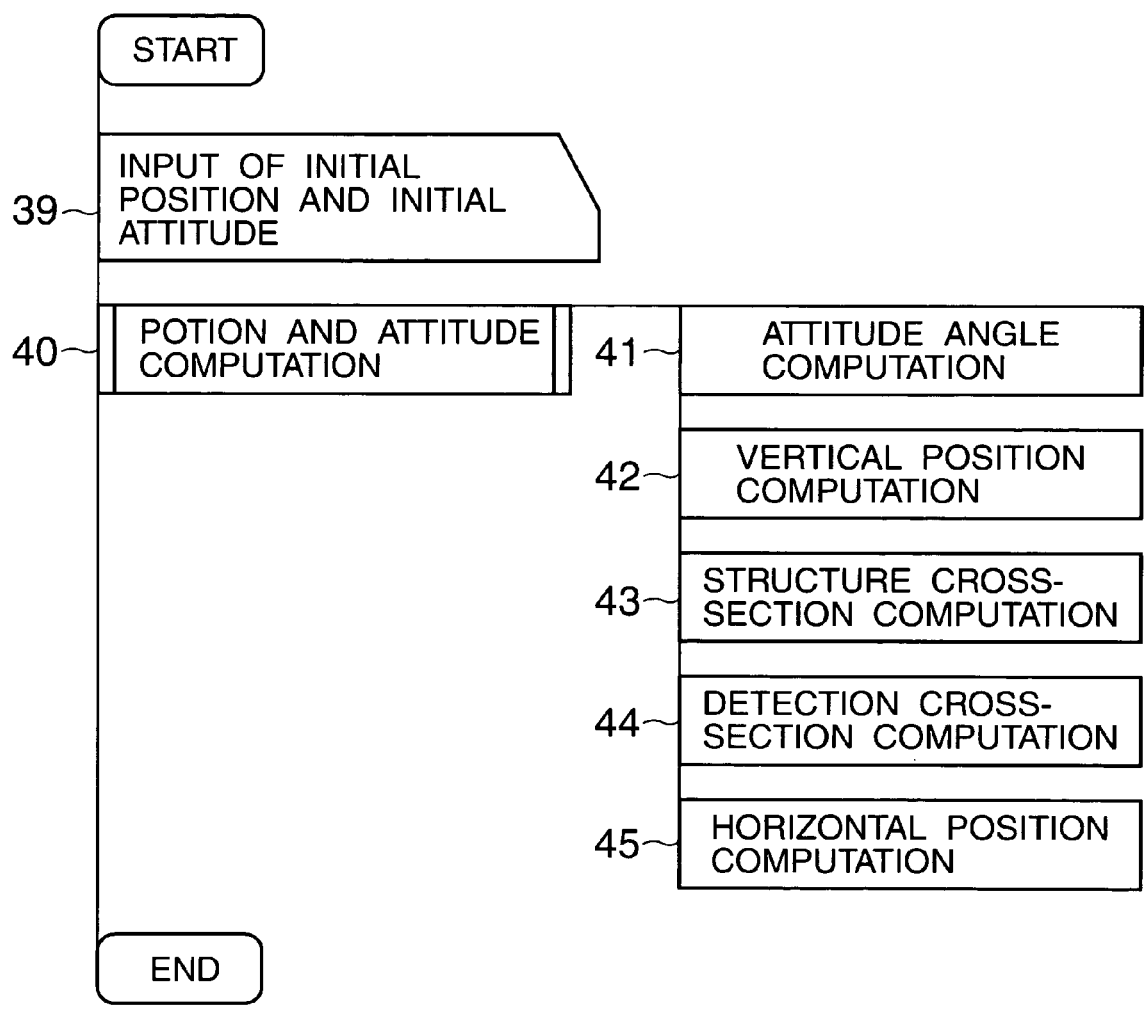
FIG. 7 is a PAD that represents details of a control process relating to the position and attitude computing functionality of the control unit in the embodiment.

FIG. 7 is a PAD that represents details of a control process relating to the position and attitude computing functionality of the control unit 11.

In step 39 of FIG. 7, data on an initial position and initial attitude of the underwater inspection unit 9 is first input. The input data is next stored into the position and attitude storage section 38. After this, control proceeds to step 40 to conduct position and attitude computations on the underwater inspection unit 9. During these position and attitude computations, attitude angle computation in step 41, vertical position computation in step 42, structure cross-section computation in step 43, detection cross-section computation in step 44, and horizontal position computation in step 45 are repeated in that order. Details of each computing step are described below.

(1) Attitude Angle Computation

Figure 8:
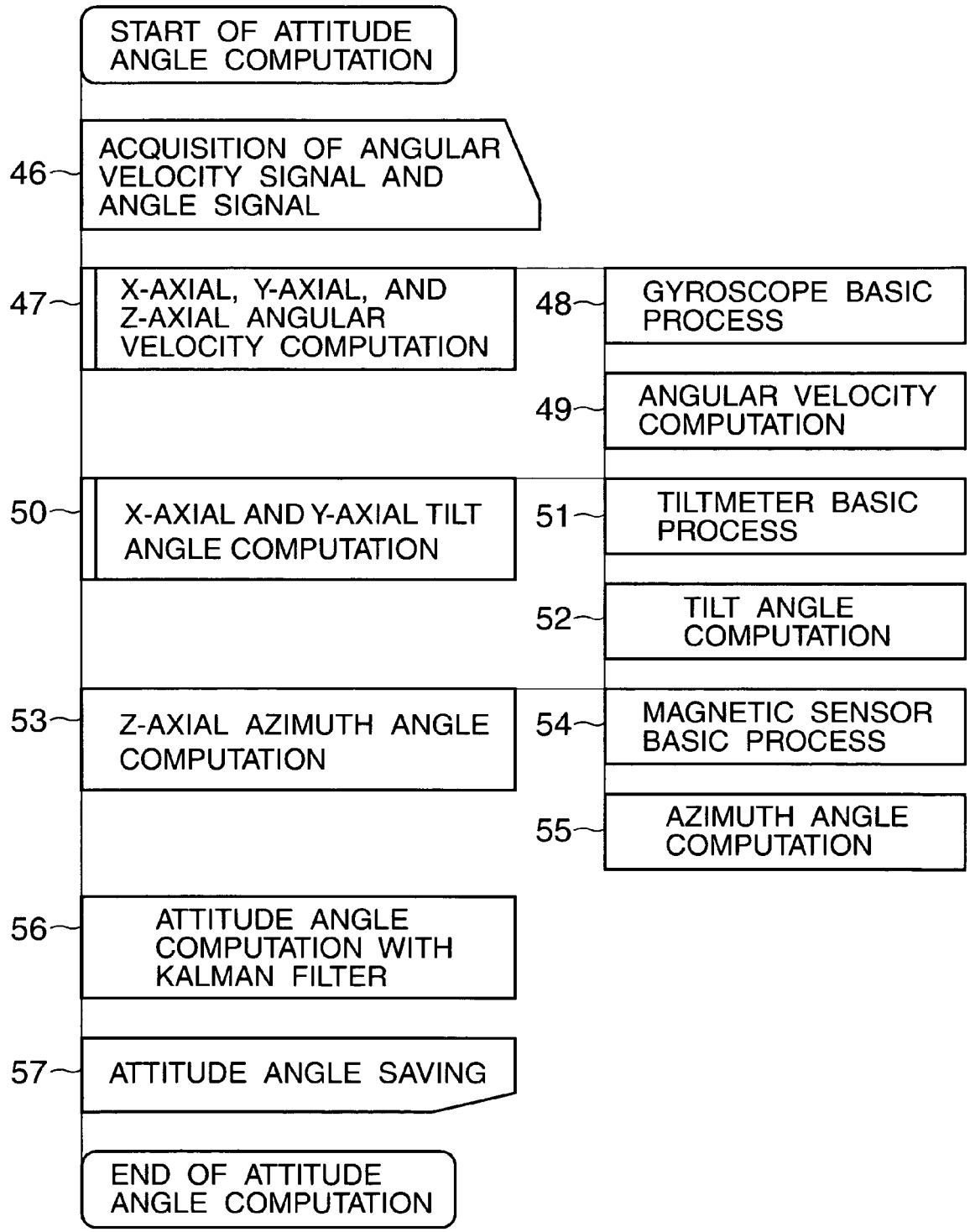
FIG. 8 is a PAD that represents details of an attitude angle computation process shown in FIG. 7.

FIG. 8 is a PAD that represents details of the attitude angle computation conducted as step 41 shown in FIG. 7.

In step 46, the angular velocity computing section 30 first acquires angular velocity signals from the tri-axis gyroscope 20, and the angle computing section 31 acquires angle signals from the tiltmeter 21 and the magnetic sensor 22.

Control proceeds to step 47, and the angular velocity computing section 30 starts the angular velocity computation to compute X-axial, Y-axial, and Z-axial angular velocities from the angular velocity signals of the tri-axis gyroscope 20. The tri-axis gyroscope 20 in the present embodiment is a gyroscope of electrostatic levitation type, and outputs a positive voltage value equal to a constant reference voltage value with an incremental or decremental value added thereto in proportion to the angular velocity value. Accordingly, firstly in step 48, a basic process for subtracting the reference voltage value is conducted on each axial (X-axial, Y-axial, and Z-axial) angular velocity signal of the tri-axial gyroscope 20. Although this reference voltage is usually shown as one characteristic specification item concerning the tri-axial gyroscope 20, the reference voltage used in the present embodiment is derived by measuring voltage values beforehand without an input angular velocity signal and averaging the measured values. After that, each axial angular velocity is calculated in step 49 by multiplying the velocity value by a voltage-angular velocity conversion coefficient (a constant value shown as another characteristic specification item concerning the tri-axial gyroscope 20).

Upon completion of the angular velocity computation in step 47, the angle computing section 31 starts the tilt angle computation in step 50 to compute X-axial and Y-axial tilt angles from the angle signals of the tiltmeter 21. The tiltmeter 21 in the present embodiment transforms a change in a liquid level of an enclosed electrolyte (i.e., X-axial and Y-axial tilt angles) into a voltage change and then outputs the voltage change. Accordingly, a basic process for subtracting another reference voltage value (a constant value shown as one characteristic specification item concerning the tiltmeter 21) from the X-axial and Y-axial signals is first conducted in step 51. After this, each axial tilt angle is calculated in step 52 by multiplying the tilt angle value by a tilt angle conversion coefficient (a constant value shown as another characteristic specification item concerning the tiltmeter 21).

Upon completion of the tilt angle computation in step 50, the angle computing section 31 starts the azimuth angle computation in step 53 to compute the Z-axial azimuth angle from the angle signal of the magnetic sensor 22. The magnetic sensor 22 in the present embodiment outputs a magnetic force picked up using a Hall element having sensitivity in the X-axis and Y-axis directions. Accordingly, a basic process for subtracting a reference voltage value from the X-axis and Y-axis magnetic signal values and then multiplying the obtained value by a gain level is first conducted in step 54. The reference voltage and the gain level differ according to a particular operating environment of the magnetic sensor 22. Values that were previously measured in an actual operating region are therefore used as the reference voltage and the gain level. After the basic process, the Z-axial azimuth angle θm is calculated in step 55 as per expression (1) using the X-axis, Y-axis signals Mx, My that have been obtained in the basic process.

[Numerical Expression 1]

$$\theta m = \tan^{-1}(My/Mx) \quad (1)$$

Upon completion of the azimuth angle computation in step 53, control proceeds to step 56 and the attitude angle computing section 32 inputs the above-described X-axial, Y-axial, and Z-axial angular velocities, X-axial and Y-axial tilt angles, and Z-axial azimuth angle, to a Kalman filter (a known filter of this kind; refer to JP-2005-A-315709, for example) and estimates an optimal tri-axial attitude angle value of the underwater inspection unit 9. This estimation is followed by step 57, in which step, the estimated attitude angle thereof is then stored into the position and attitude storage section 38. The attitude angle computation ends with completion of step 57.

(2) Vertical Position Computation

FIG. 9 is a PAD that represents details of the vertical position computation conducted as step 42 shown in FIG. 7.

In the vertical position computation, the vertical position computing section 33 first acquires a pressure signal (detected voltage) from the pressure sensor 18 in step 58, and then in step 59, calculates pressure P by subtracting a reference voltage Vp_base (a constant voltage value shown as one characteristic specification item relating to the pressure sensor 18) from the detected voltage Vp and then further multiplying the obtained value by a pressure conversion coefficient (a constant value shown as another characteristic specification item relating to the pressure sensor 18). After that, the depth H of the underwater inspection unit 9 in the water is calculated in step 60 as per expression (2) using the calculated pressure P and a density ρ and gravitational acceleration g of a coolant present inside the reactor 1. For example, distance Lw (see FIG. 1) from the operation floor 7 to the water level is next added to the calculated depth H, and the position thus derived is recognized as the vertical position of the underwater inspection unit 9.

[Numerical Expression 2]

$$H = P/\rho g \quad (2)$$

The above recognition is followed by step 61, in which step, the calculated vertical position of the underwater inspection unit 9 is then stored into the position and attitude storage section 38. The vertical position computation ends with completion of step 61.

(3) Structure Cross-Section Computation.

FIG. 10 is a PAD that represents details of the structure cross-section computation conducted as step 43 shown in FIG. 7.

Figure 11:
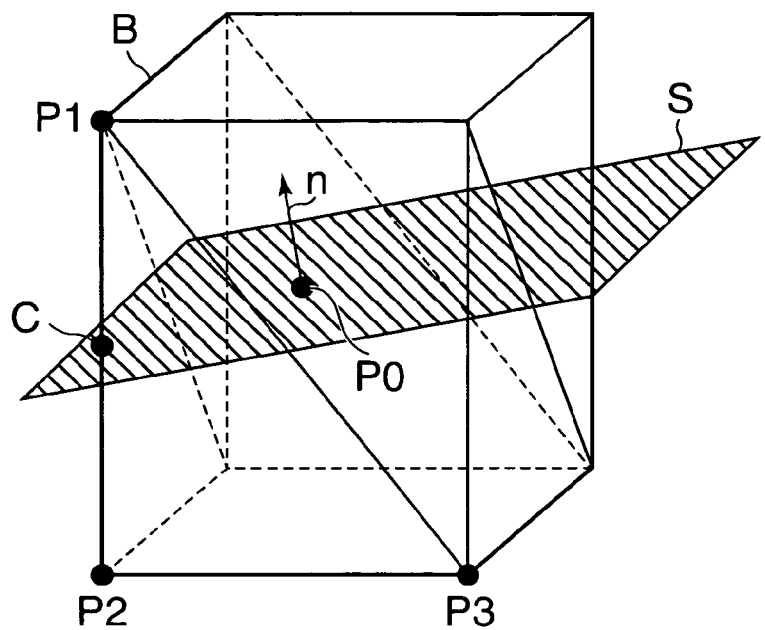
FIG. 11 is a diagram representing as an example of a model for explaining the structure cross-section computation process.

In the structure cross-section computation, the structure cross-section computing section 35 first acquires in step 62 the current vertical position of the underwater inspection unit 9 that is stored in the position and attitude storage section 38 (in other words, the vertical position calculated in step 60), and the current attitude angle (in other words, the attitude angle calculated in step 56). The structure cross-section computing section 35 also acquires the previous horizontal position of the underwater inspection unit 9 that was stored into the position and attitude storage section 38. More specifically, the previous horizontal position acquired is initially the initial horizontal position value that was previously input in step 39, and after the horizontal position computation in step 45, the value last computed. After the acquisition of the above data, a Z-axial vector n(a, b, c) of the underwater inspection unit 9 in an absolute-position coordinate system is generated in step 63 on the basis of the attitude angle of the underwater inspection unit 9. Next, plane S (see FIG. 11) that passes through position P0(x0, y0, z0) of the underwater inspection unit 9 with the vector n(a, b, c) as a normal-line vector (position P0 is equivalent to an absolute position of point O in FIG. 5, acquired in step 62) is defined as the detection direction plane of the range sensor unit 23 of the underwater inspection unit 9. If the position of the plane S is taken as any point P(x, y, z) in the absolute-position coordinate system, an equation for the position of the plane S will be expressed as follows:

[Numerical Expression 3]

$$(P-P0)\cdot n = a(x-x0)+b(y-y0)+(z-z0)=0 \qquad (3)$$

After that, the structure data that is stored in the structures data storage section 34 is acquired in step 64. This structure data is constructed by, for example, dividing a surface shape of structure B by a plurality of triangle polygons, wherein positions of vertexes P1, P2, and P3 forming the triangle polygons, and a combination of the vertexes P1, P2, and P3 (in other words, line segments P1P2, P1P3, and P1P3) are contained as information. Next, the cross-sectional shape and position of the structure at the detection direction plane of the range sensor unit 23 are computed in step 65. More specifically, whether the line segments (e.g., segments P1P2, P1P3, P1P3) of the triangle polygons constituting the surface shape of the structure B intersect with the plane S is detected first. For example, whether the segment P1P2 intersects with the plane S is judged using expression (4).

[Numerical Expression 4]

$$\{(P1-P0)\cdot n\}\cdot\{(P2-P0)\cdot n\}\leq: \text{Intersection detected}$$

$$\{(P1-P0)\cdot n\}\cdot\{(P2-P0)\cdot n\}>: \text{Intersection not detected} \qquad (4)$$

For example, if the segment P1P2 is judged to intersect with the plane S, the crossing point C(xC, yC, zC) is calculated using the following simultaneous equations (expression 5). The equation in an upper row of the simultaneous equations (expression 5) is obtained by substituting the crossing point C into above expression (3), and the equation in a lower row is that relating to the segment P1P2. In the lower equation, V is a unit vector of the segment p1P2.

[Numerical expression 5]

$$\begin{cases} (C-P0)\cdot n = 0 \\ C = P1 + tV \end{cases} \qquad (5)$$

In step 66, the crossing points C(1) to C(m) that have been calculated for all segments are stored as structure cross-sectional data. The structure cross-section computation ends with completion of step 66.

(4) Detection Cross-Section Computation

Figure 12:
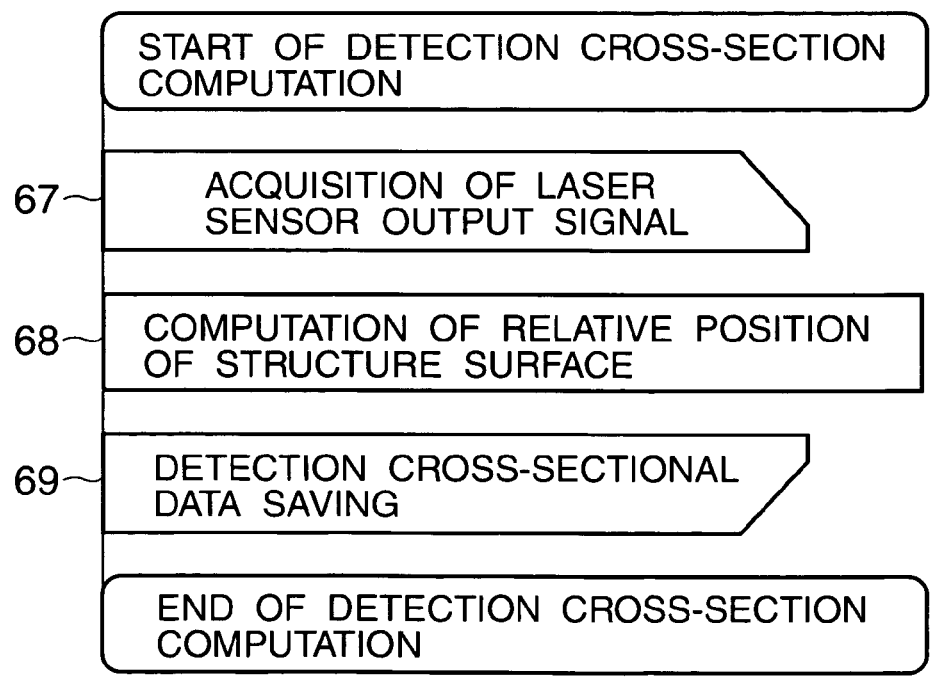
FIG. 12 is a PAD that represents details of a detection cross-section computation process shown in FIG. 7.

FIG. 12 is a PAD that represents details of the detection cross-section computation conducted as step 44 shown in FIG. 7.

In the detection cross-section computation, the detection cross-section computing section 36 first acquires output signals from the laser sensors 24a, 24b in step 67. As described above, the output signals from the laser sensors 24a, 24b contain as information the relative distances M between the underwater inspection unit 9 and a neighboring structure, at scan angles θa and θb, respectively. After the signal acquisition, positions L(1) to L(2n) of the surface of the structure (in other words, relative positions with origin O as their reference) in the X-Y coordinate system shown in FIG. 5 (i.e., at the detection direction plane of the range sensor unit 23) are calculated in step 68 as per expressions (6) and (7).

[Numerical expression 6]

$$\begin{cases} xL = M\cdot\cos\theta a \\ yL = M\cdot\sin\theta a + D1 \end{cases} \qquad (6)$$

[Numerical expression 7]

$$\begin{cases} xL = M\cdot\cos\theta b \\ yL = M\cdot\sin\theta b - D2 \end{cases} \qquad (7)$$

After that, the calculated positions L(1) to L(2n) of the surface of the structure are stored as detection cross-sectional data in step 69. The detection cross-section computation ends with completion of step 69.

(5) Horizontal Position Computation

Figure 13:
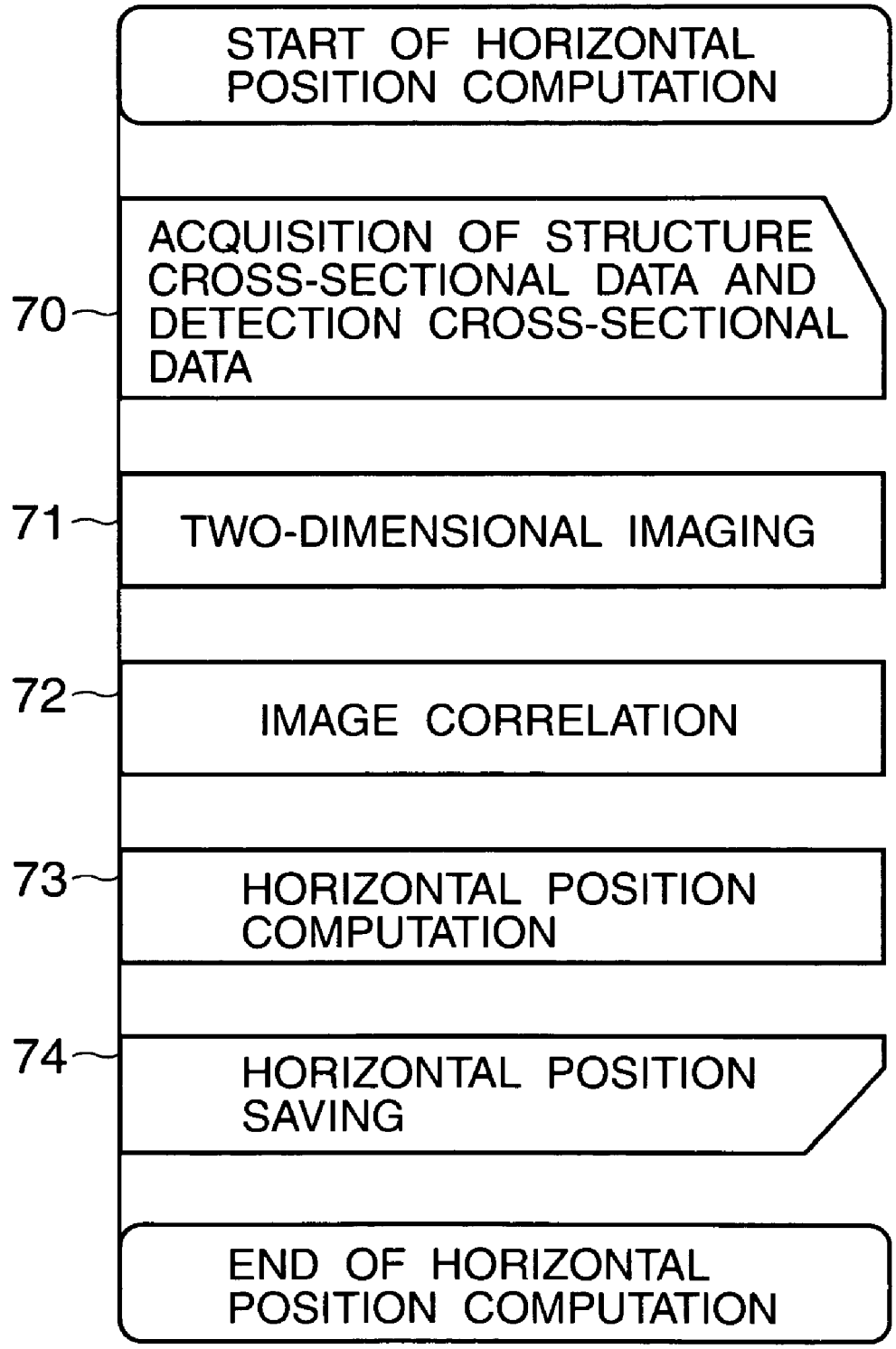
FIG. 13 is a PAD that represents details of a horizontal position computation process shown in FIG. 7.

FIG. 13 is a PAD that represents details of the horizontal position computation conducted as step 45 shown in FIG. 7.

Figure 14A:
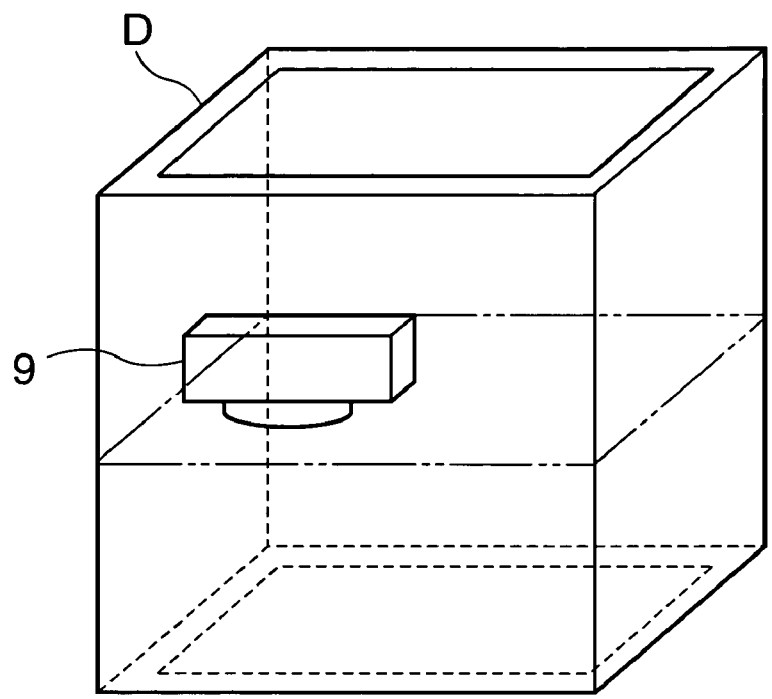
FIGS. 14A and 14B are explanatory diagrams on image correlation.

In the horizontal position computation, the horizontal position computing section 37 first acquires in step 70 the structure cross-sectional data generated by the structure cross-section computing section 35, and the detection cross-sectional data generated by the detection cross-section computing section 36. After that, a two-dimensional image of the cross-sectional shape of the structure is generated from the structure cross-sectional data in step 71. That is to say, a plane rotational moving process that directs the normal-line vector "n" of the plane S to the Z-axial vector of the underwater inspection unit 9 takes place to convert the crossing points C(1) to C(m) contained in the structure cross-sectional data, from the absolute-position coordinate system into the X-Y coordinate system and generate a bit-mapped image that contains information of the crossing points C'(1) to C'(m) obtained by the coordinate conversion. The bit-mapped image is hereinafter termed the structure cross-sectional image. Another bit-mapped image is generated that contains information about the position (origin O) of the underwater inspection unit 9, contained in the detection cross-sectional data, and contains information about the relative positions L(1) to L(2n) of the structure surface that are based on the origin O. The second bit-mapped image is hereinafter termed the detection cross-sectional image. The structure cross-sectional image F1 and detection cross-sectional image F2 generated in a 640×480 format, for instance, when the underwater inspection unit 9 is disposed in structure D having a shape of a hollow rectangular parallelepiped, as shown in FIG. 14A, are shown in FIG. 14B as a specific example.

Figure 14B:
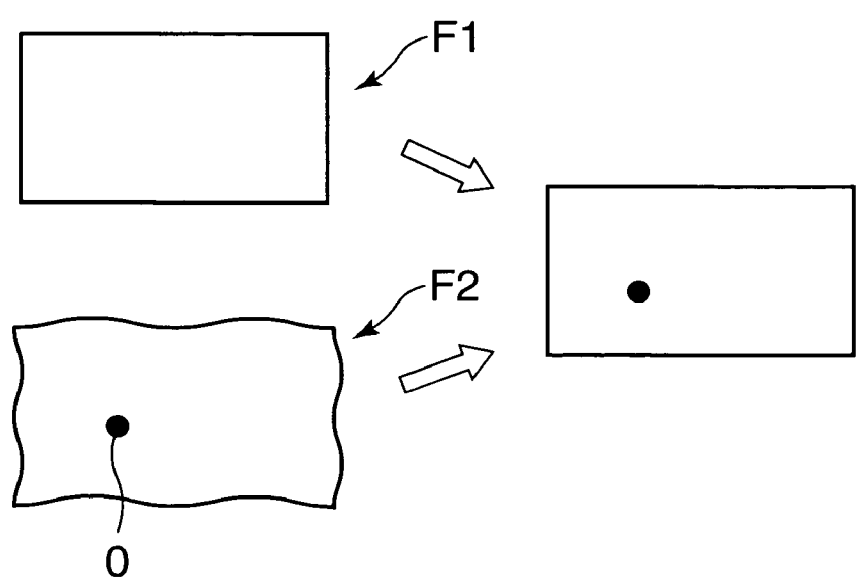

In step 72, image correlation, for example, is conducted to match the structure cross-sectional image F1 and the detection cross-sectional image F2, as shown in FIG. 14B. Thus, the relative position of the underwater inspection unit 9 on the structure cross-sectional image F1 is calculated. In step 73, a plane rotational moving process that directs the Z-axial vector of the underwater inspection unit 9 to the normal-line vector "n" of the plane S takes place to convert the position of the underwater inspection unit 9, contained in the structure cross-sectional image F1, from the X-Y coordinate system into the absolute-position coordinate system and calculate the horizontal position of the underwater inspection unit 9. Next in step 74, the calculated horizontal position thereof is stored into the position and attitude storage section 38. The horizontal position computation ends with completion of step 74.

The position and attitude of the underwater inspection unit 9 that have thus been stored into the position and attitude storage section 38 of the control unit 11 are next output to and displayed at the display unit 12. FIG. 15 is a diagram showing an example of a display screen of the display unit 12.

The display screen 75 shown in FIG. 15 includes a position coordinate display area 76, a horizontal position image display area 77, a vertical position image display area 78, and a camera image display area 79. The absolute position of the underwater inspection unit 9, loaded from the position and attitude storage section 38 of the control unit 11, is displayed in the position coordinate display area 76. Also, along with the horizontal sectional image of the structure that has been loaded from the structures data storage section 34, a marker indicating the horizontal position of the underwater inspection unit 9 is displayed in the horizontal position image display area 77. Along with the vertical sectional image of the structure that has been loaded from the structures data storage section 34, a marker indicating the vertical position of the underwater inspection unit 9 is displayed in the vertical position image display area 78. The display unit 12 is constructed so that an image from the camera 15 is displayed in the camera image display area 79. The display unit 12 is also constructed so that the display screen can be switched to other display screen modes not shown. For example, the attitude of the underwater inspection unit 9, loaded from the position and attitude storage section 38, can thus be displayed.

In the present embodiment with the above-described construction, the control unit 11 computes the vertical position of the underwater inspection unit 9, based on the detection results of the pressure sensor 18 provided in the underwater inspection unit 9. The control unit 11 also computes the attitude of the underwater inspection unit 9, based on the detection results of the inertial sensor 19 provided in the underwater inspection unit 9. In addition, the control unit 11 generates structure cross-sectional data by computing the position of the detection direction plane of the range sensor unit 23, based on the vertical position and attitude of the underwater inspection unit 9, and then computing from the structure data the cross-sectional shape and position of the structure at the position of the detection direction plane. The control unit 11 further uses the detection results of the range sensor unit 23 to generate detection cross-sectional data by computing the relative position of the surface of the structure with respect to the position of the underwater inspection unit 9, that is, the reference position, at the detection direction plane of the range sensor unit 23. Furthermore, the control unit 11 matches the structure cross-sectional data and the detection cross-sectional data to compute the relative position of the underwater inspection unit 9 with respect to the cross-sectional shape of the structure and further compute the horizontal position of the underwater inspection unit 9, based on the position information of the cross-sectional shape of the structure. In the present embodiment, therefore, computation errors can be reduced in comparison with the conventional technique in which the absolute position of the underwater inspection unit 9 is computed by, for example, computing the variations in the position of the underwater inspection unit 9 and totalizing these variations. Detection accuracy on the position of the underwater inspection unit 9 can be improved as a result.

In the present embodiment, the underwater inspection unit 9 can yield the following advantageous effects since the range sensor unit 23 with laser sensors 24a, 24b each including the beam projector 26 and the beam receiver 27 is provided as the relative distance detector for detecting the relative distance with respect to the structure. This means that in a configuration with either the projector or the receiver provided on the underwater inspection unit side and the other provided on the structure side, the position of the underwater inspection unit becomes difficult to detect if the inspection unit is used under an environment having a small narrow region or a complex structure interposed in the environment. In the present embodiment, however, since both the projector 26 and the receiver 27 are provided on the underwater inspection unit side, the position thereof can be detected, even if the underwater inspection unit 9 is used under the environment having a small narrow region or a complex structure interposed in the environment.

The above embodiment has been described using an example which assumes that the attitude of the underwater inspection unit 9 changes. In this case, the structure cross-section computing section 35 of the control unit 11 computes the cross-sectional shape and position of a structure at the detection direction plane of the range sensor unit 23 by computing the position of the detection direction plane of the range sensor unit 23 on the basis of the vertical position and attitude angle of the underwater inspection unit 9 that have been computed from the detection results of the pressure sensor 18 and the detection results of the inertial sensor 19, respectively. However, the present invention is not limited to such assumption. That is to say, for example, there is a case where the attitude of the underwater inspection unit 9 is stable and almost invariant. In such a case, the structure cross-section computing section 35 of the control unit 11 may compute the position of the detection direction plane of the range sensor unit 23 on the basis only of the vertical position of the underwater inspection unit 9 computed from the detection results of the pressure sensor 18, and then compute the cross-sectional shape and position of the structure at the detection direction plane of the range sensor unit 23. Substantially the same effects as those described above can also be obtained in such a case.

In addition, the scanning laser sensors 24a, 24b that scan laser light in a number of directions and receive the light reflected have been described as an example of relative distance detectors in the description of the above embodiment, but this example does not limit the present invention. That is to say, the scanning laser sensors may be replaced with laser sensors that each project laser light in at least three prefixed directions and receive the light reflected. For example, unless operation is affected too significantly by echoes of ultrasonic waves, ultrasonic sensors that transmit ultrasonic waves and receive the waves reflected may be provided as another alternative. Substantially the same effects as those described above can also be obtained in that case.

What is claimed is:

1. A system for detecting a position of an underwater vehicle adapted to move three-dimensionally, the system comprising:
 a vertical position detector provided on the underwater vehicle for detecting a vertical position of the vehicle;
 a relative distance detector provided on the underwater vehicle, the distance detector being adapted for detecting a relative distance between the underwater vehicle and a structure neighboring the vehicle, in each of at least three directions on substantially the same plane predefined with respect to the attitude of the vehicle;

storage means for storing data on a three-dimensional shape which is constructed by a plurality of triangle polygons dividing a surface shape of the structure, and on a position of the structure;

structure cross-section computing means for computing a position of a detection direction plane of the relative distance detector on the basis of the vertical position of the underwater vehicle that has been detected by the vertical position detector, and computing a cross-sectional shape and position of the structure at the computed position of the detection direction plane of the relative distance detector on the basis of the structure data that is stored in the storage means; and horizontal position computing means for computing, from detection results by the relative distance detector, a relative position of the underwater vehicle with respect to the structure cross-sectional shape that has been computed by the structure cross-section computing means, the horizontal position computing means being further adapted to compute a horizontal position of the underwater vehicle from position information in the cross-sectional shape of the structure.

2. The position detection system according to claim 1, further comprising:

detection cross-section computing means by which, when the position of the underwater vehicle at the detection direction plane of the relative distance detector is defined as a reference position, a relative position of the surface of the structure with respect to the reference position is computed from the detection results of the relative distance detector; wherein the horizontal position computing means matches the relative position of the structure surface, computed by the detection cross-section computing means, and the cross-sectional shape of the structure, computed by the structure cross-section computing means, and thus computes a relative position of the underwater vehicle with respect to the cross-sectional shape of the structure that was computed by the structure cross-section computing means.

3. The position detection system according to claim 1, wherein: the vertical position detector is a pressure sensor for detecting a depth of the underwater vehicle in water.

4. The position detection system according to claim 1, wherein: the relative distance detector is a scanning laser sensor for scanning laser light in a number of directions and receiving the light reflected.

5. A system for detecting a position of an underwater vehicle adapted to move three-dimensionally, the system comprising:

a vertical position detector provided on the underwater vehicle for detecting a vertical position of the vehicle;

an attitude angle detector provided on the underwater vehicle for detecting an attitude angle of the vehicle;

a relative distance detector provided on a lower portion of the underwater vehicle, the distance detector being adapted for detecting a relative distance between the underwater vehicle and a structure neighboring the vehicle, in each of at least three directions on substantially the same plane predefined with respect to the attitude of the vehicle;

storage means for storing data on a three-dimensional shape which is constructed by a plurality of triangle polygons dividing a surface shape of the structure, and on a position of the structure;

structure cross-section computing means for computing a position of a detection direction plane of the relative distance detector on the basis of the vertical position and attitude angle of the underwater vehicle that have been detected by the vertical position detector and the attitude angle detector, respectively, and thus computing a cross-sectional shape and position of the structure at the computed position of the detection direction plane of the relative distance detector on the basis of the structure data that has been stored into the storage means; and horizontal position computing means for computing, from detection results by the relative distance detector, a relative position of the underwater vehicle with respect to the cross-sectional shape of the structure that has been computed by the structure cross-section computing means, the horizontal position computing means being further adapted to compute a horizontal position of the underwater vehicle from position information in the cross-sectional shape of the structure.

6. The position detection system according to claim 5, wherein:

the structure cross-section computing means is configured to initially compute the position of the detection direction plane of the relative distance detector on the basis of, in addition to the vertical position and attitude angle of the underwater vehicle that have been detected by the vertical position detector and the attitude angle detector, respectively, preassigned initial data relating to the horizontal position of the underwater vehicle, and after the structure cross-section computing means has computed the horizontal position of the underwater vehicle, compute the position of the detection direction plane of the relative distance detector on the basis of, in addition to the vertical position and attitude angle of the underwater vehicle detected by the vertical position detector and the attitude angle detector, respectively, previous computation results relating to the horizontal position of the underwater vehicle computed by the horizontal position computing means.

* * * * *

UNITED STATES PATENT AND TRADEMARK OFFICE
CERTIFICATE OF CORRECTION

| | | |
|---|---|---|
| PATENT NO. | : 8,370,105 B2 | Page 1 of 1 |
| APPLICATION NO. | : 12/457330 | |
| DATED | : February 5, 2013 | |
| INVENTOR(S) | : Kobayashi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 551 days.

Signed and Sealed this
Thirtieth Day of December, 2014

Michelle K. Lee
*Deputy Director of the United States Patent and Trademark Office*